US009887422B2

United States Patent
Ko (10) Patent No.: US 9,887,422 B2
(45) Date of Patent: Feb. 6, 2018

(54) NEGATIVE ELECTRODE FOR RECHARGEABLE LITHIUM BATTERY AND RECHARGEABLE LITHIUM BATTERY INCLUDING SAME

(71) Applicant: SAMSUNG SDI CO., LTD., Yongin-si, Gyeonggi-do (KR)

(72) Inventor: Seongjae Ko, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 0 days.

(21) Appl. No.: 15/159,708

(22) Filed: May 19, 2016

(65) Prior Publication Data

US 2017/0005335 A1    Jan. 5, 2017

(30) Foreign Application Priority Data

Jun. 30, 2015   (KR) .................. 10-2015-0093151

(51) Int. Cl.
| | |
|---|---|
| *H01M 4/583* | (2010.01) |
| *H01M 4/133* | (2010.01) |
| *H01M 4/134* | (2010.01) |
| *H01M 10/052* | (2010.01) |
| *H01M 4/38* | (2006.01) |
| *H01M 10/0525* | (2010.01) |
| *H01M 4/02* | (2006.01) |

(52) U.S. Cl.
CPC .......... *H01M 4/583* (2013.01); *H01M 4/133* (2013.01); *H01M 4/134* (2013.01); *H01M 4/386* (2013.01); *H01M 10/052* (2013.01); *H01M 10/0525* (2013.01); *H01M 2004/027* (2013.01)

(58) Field of Classification Search
CPC .. H01M 4/583; H01M 4/386; H01M 10/0525; H01M 4/133
See application file for complete search history.

(56) References Cited

U.S. PATENT DOCUMENTS

| | | | |
|---|---|---|---|
| 6,803,150 B1 | 10/2004 | Iriyama et al. | |
| 8,338,026 B2 | 12/2012 | Hong et al. | |
| 2013/0266849 A1* | 10/2013 | Hara | H01M 4/364 429/179 |

(Continued)

FOREIGN PATENT DOCUMENTS

| | | |
|---|---|---|
| JP | 9-27314 A | 1/1997 |
| JP | 2012-216532 A | 11/2012 |

(Continued)

OTHER PUBLICATIONS

EPO Search Report dated Aug. 17, 2016 for corresponding European Patent Application No. 16177011.0, (7 pages).

(Continued)

*Primary Examiner* — Stewart A Fraser
(74) *Attorney, Agent, or Firm* — Lewis Roca Rothgerber Christie LLP (57) ABSTRACT

A negative electrode for a rechargeable lithium battery includes a negative active material layer including a negative active material. The negative active material includes a first active material and a second active material different from the first active material, the second active material includes flake-shaped graphite, and the negative electrode has an active mass density of greater than or equal to about 1.70 g/cc.

9 Claims, 6 Drawing Sheets (56) References Cited

U.S. PATENT DOCUMENTS

2015/0357632 A1* 12/2015 Nishimura ............ H01M 4/133
  429/231.4
2016/0211512 A1    7/2016 Sugiyama et al.

FOREIGN PATENT DOCUMENTS

| JP | 2013-258130 A | 12/2013 |
| JP | 2014-67583 A | 4/2014 |
| JP | 2015-064936 A | 4/2015 |
| WO | WO 2010/137889 A2 | 12/2010 |

OTHER PUBLICATIONS

Machine English Translation of Japanese Publication No. 9-27314 A, dated Jan. 28, 1997, 14 Pages.
Machine English Translation of Japanese Publication No. 2012-216532 A, dated Nov. 8, 2012, 46 Pages.
Machine English Translation of Japanese Publication No. 2014-67583 A, dated Apr. 17, 2014, 24 Pages.
EPO Office Action dated Nov. 14, 2017, for corresponding European Patent Application No. 16177011.0 (3 pages).

* cited by examiner

NEGATIVE ELECTRODE FOR RECHARGEABLE LITHIUM BATTERY AND RECHARGEABLE LITHIUM BATTERY INCLUDING SAME

CROSS-REFERENCE TO RELATED APPLICATION

This application claims priority to and the benefit of Korean Patent Application No. 10-2015-0093151 filed in the Korean Intellectual Property Office on Jun. 30, 2015, the entire contents of which are incorporated herein by reference.

BACKGROUND

1. Field

A negative electrode for a rechargeable lithium battery and a rechargeable lithium battery including the same are disclosed.

2. Description of the Related Art

Lithium rechargeable batteries have recently drawn attention as a power source for small portable electronic devices. The lithium rechargeable batteries use an organic electrolyte solution and thereby, have discharge voltage that is two or more times greater than that of a conventional battery using an alkali aqueous solution. Accordingly, lithium rechargeable batteries have high energy density.

Such a rechargeable lithium battery is manufactured by injecting an electrolyte into an electrode assembly, which includes a positive electrode having a positive active material capable of intercalating/deintercalating lithium ions and a negative electrode having a negative active material capable of intercalating/deintercalating lithium ions.

On the other hand, the basic frame of the negative active material becomes broken due to expansion during charge, and accordingly, development of a low expansion negative active material is being made. However, most of research considers theoretical expansion force during the charge and remains in adjusting orientation of the negative active material. Thus, there is a limit to the development of the negative active material having low expansion.

SUMMARY

One aspect of an embodiment provides a negative electrode for a rechargeable lithium battery preventing cell expansion by minimizing or reducing pores inside an electrode and uniformly or substantially uniformly distributing the pores therein.

Another aspect of an embodiment provides a rechargeable lithium battery including the negative electrode for a rechargeable lithium battery.

One aspect of an embodiment provides a negative electrode for a rechargeable lithium battery, the negative electrode including: a negative active material layer including a negative active material, wherein: the negative active material includes a first active material and a second active material different from the first active material, the second active material includes flake-shaped graphite, a ratio of a particle diameter (D50) of the first active material relative to the longest length of the second active material is about 2 to about 50, and the negative electrode has an active mass density of greater than or equal to about 1.70 g/cc.

The second active material includes a shorter side and a longer side, the longer side having a length of about 0.5 µm to about 10 µm.

The second active material is located between a plurality of first active materials.

The first active material includes a carbon-based material, a silicon-based material, or a combination thereof.

The first active material has a particle diameter (D50) of about 5 µm to about 40 µm.

The negative active material layer has porosity of about 5 volume % to about 25 volume %.

The negative electrode has a loading level of about 10 mg/cm2 to about 40 mg/cm2.

The negative active material includes about 1 wt % to about 8 wt % of the second active material based on a total amount of the first active material and the second active material.

A rechargeable lithium battery includes the negative electrode according to an aspect of the embodiment.

Other embodiments are described in the following detailed description.

Therefore, cell expansion of a rechargeable lithium battery according to embodiments of the present invention may be prevented or reduced by minimizing or reducing pores in an electrode and uniformly or substantially uniformly distributing the pores.

DETAILED DESCRIPTION

Hereinafter, the embodiments are described in more detail with reference to the accompanying drawings. However, these embodiments are exemplary, and this disclosure is not limited thereto. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the terms "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Hereinafter, a negative electrode for a rechargeable lithium battery according to one embodiment is described.

A negative electrode for a rechargeable lithium battery includes a current collector and a negative active material layer on the current collector, and the negative active material layer includes a negative active material.

The negative active material is theoretically expanded during charge and in addition, physicochemically expanded and thus mainly causes expansion of a battery. For example, the physical expansion of the negative active material is caused by pores among the negative active material when relieving physical stress generated through a press process and the like during formation of an electrode, and the chemical expansion is caused due to a side reaction among negative active material through charge and discharge. Consequently, both expansions cause a battery expansion.

According to one embodiment, a low battery expansion may be obtained by giving fluidity to the negative active material to relieve stress that the negative active material receives when pressed, leading to regular rearrangement of pores generated during charge and discharge as well as improving orientation inside an electrode, and thus minimizing or reducing porosity.

The negative active material according to one embodiment may include a first active material and a second active material.

The first active material as a main active material is included in a greater amount than the second active material and may include any suitable material used for a negative electrode for a rechargeable lithium battery material without particular limitations.

In some embodiments, the first active material may include a carbon-based material, a silicon-based material, or a combination (e.g., mixture) thereof.

The carbon-based material may be crystalline carbon, amorphous carbon, or a combination (e.g., mixture) thereof. Examples of the crystalline carbon may be non-shaped or sheet, flake, spherical, or fiber shaped natural graphite or artificial graphite, and examples of the amorphous carbon may be a soft carbon, a hard carbon, a mesophase pitch carbonized product, fired coke, and/or the like.

Examples of the silicon-based material may be Si, $SiO_x$ ($0<x<2$), a Si—C composite, a Si-Q alloy (wherein Q is an alkali metal, an alkaline-earth metal, Group 13 to 16 elements, a transition metal, a rare earth element, or combination thereof, and not Si), and/or the like, and at least one of these may be mixed with $SiO_2$. Specific elements of the Q may be Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof.

In some embodiments, the first active material may be graphite.

The second active material as an auxiliary material is included in a lesser amount than the first active material and may differ from the first active material, and for example include flake-shaped graphite.

The flake-shaped graphite may have a smaller particle size than the first active material. The flake-shaped graphite having a small particle size may be present among the first active material particles inside an electrode.

In other words, the negative active material layer according to one embodiment may have a structure where the flake-shaped graphite is inserted among the first active material particles. The structure may give fluidity to the first active material when pressed for forming a negative electrode and thus leads to maximizing or increasing packaging efficiency. In other words, an electrode having the flake-shaped structure shows a uniform or substantially uniform distribution of pores relative to an electrode consisting of only first active material particles, and thus relieves a stress that an active material receives when pressed, and accordingly, the smaller stress the active material receives, the less the physical stress is relieved during cycles, resultantly leading to a lower battery expansion.

In addition, the structure where the flake-shaped graphite is present among the first active material particle gives fluidity to the active material during charge and discharge, minimizes or reduces unnecessary pores among the active material particles, increases a packaging rate all over the electrode, and results in leading to a lower battery expansion.

The second active material such as the flake-shaped graphite has a flake shape having a set (e.g., predetermined) width and height, and the width may include the relatively long side and the relatively short side. The long side may have a length ranging from about 0.5 µm to about 10 µm and, for example, about 1 µm to about 5 µm.

The first active material may be a particle having a set (e.g., predetermined) particle diameter (D50), and the first active material may have a particle diameter (D50) of about 5 µm to about 40 µm, for example, about 10 µm to about 25 µm. For example, the particle diameter (D50) of the first active material relative to the length of the long side of the second active material may have a ratio ranging from about 2 to about 50, for example, about 2 to about 40, about 2 to about 30, about 5 to about 30, about 10 to about 30, and/or about 15 to about 30. When the particle diameter (D50) of the first active material relative to the length of the long side of the second active material has a ratio within the range, excellent fluidity is given to the first active material, pores inside an electrode are minimized or reduced and uniformly or substantially uniformly distributed during formation of a structure where the flake-shaped graphite is present among first active material particles. Accordingly, as the first active material may undergo less stress when pressed, orientation inside the electrode may not only be improved, but pores generated during charge and discharge are also minimized or reduced, and resultantly, an expansion all over a battery may be minimized or reduced.

Herein, D50 refers to Dv50 which is known as volume median or volume average particle size, it physically represents that each volume of particles greater or smaller than such value takes account of 50% of the total particles volume. D50 of an active material from an electrode before manufacturing a battery or an electrode separated from the battery may be determined by calculating an average of diameters from about 100 samples obtained from a scanning electron microscope (SEM), which shows a cross section of an electrode.

The second active material may be present in an amount of about 1 wt % to about 8 wt %, for example, about 3 wt % to about 5 wt % based on the total amount of the first active material and the second active material. When the second active material is included within the amount range, an optimal pore structure capable of leading low expansion of a battery may be obtained by giving excellent fluidity to the first active material.

The negative active material layer may have porosity of about 5 volume % to about 25 volume %, for example, about 15 volume % to about 25 volume %. When the negative active material layer has porosity within the range, the negative active material may not only have less stress when pressed for forming a negative electrode, but pores generated during charge and discharge may also be minimized or reduced, leading to low expansion of a battery.

The negative electrode may have a loading level of about 10 $mg/cm^2$ to about 40 $mg/cm^2$, for example, about 15 $mg/cm^2$ to about 30 $mg/cm^2$. As the negative electrode has a higher loading level, current density becomes higher and thus causes a side effect of increasing overall resistance of a battery. The high resistance leads to deteriorating performance of the battery during charge and discharge and accordingly, brings about overall performance deterioration of the battery and a high expansion ratio. According to one embodiment, a low loading level within the range may be realized by minimizing or reducing porosity of a negative active material layer.

The current collector may be a copper foil, a nickel foil, a stainless steel foil, a titanium foil, a nickel foam, a copper foam, a polymer substrate coated with a conductive metal, or a combination thereof, but is not limited thereto.

The negative active material layer may include at least one of a binder and a conductive material in addition to the negative active material.

The binder improves binding properties of negative active material particles with one another and with a current collector. The binder may be a non-aqueous binder, an aqueous binder, or a combination thereof.

The non-aqueous binder may be polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, polyamideimide, polyimide, or a combination thereof.

The aqueous binder may be a rubber-based binder or a polymer resin binder.

The rubber-based binder may be selected from a styrene-butadiene rubber, an acrylated styrene-butadiene rubber (SBR), an acrylonitrile-butadiene rubber, an acrylic rubber, a butyl rubber, a fluorine rubber, and a combination thereof.

The polymer resin binder may be selected from polyethylene, ethylenepropylene copolymer, epichlorohydrin, polyphosphazene, polyacrylonitrile, polystyrene, ethylenepropylenediene copolymer, polyvinylpyridine, chlorosulfonated polyethylene, latex, a polyester resin, an acrylic resin, a phenolic resin, an epoxy resin, polyvinyl alcohol and a combination thereof.

When the aqueous binder is used as a negative electrode binder, a cellulose-based compound may be further used to provide viscosity. The cellulose-based compound includes one or more of carboxylmethyl cellulose, hydroxypropylmethyl cellulose, methyl cellulose, or alkali metal salts thereof. The alkali metal may be Na, K, or Li. Such a thickener may be included in an amount of about 0.1 parts by weight to about 3 parts by weight based on 100 parts by weight of the negative active material.

The conductive material improves conductivity of an electrode. Any electrically conductive material may be used as a conductive material, unless it causes a chemical change, and examples thereof may be natural graphite, artificial graphite, carbon black, acetylene black, ketjen black, carbon fiber and/or like carbon-based material; copper, nickel, aluminum, silver, and/or like metal powder or metal fiber and/or like metal-based material; polyphenylene derivative and/or like conductive polymer; and/or a mixture thereof.

A negative electrode according to one embodiment may have high active mass density. The negative electrode has high active mass density but may minimize or reduce overall battery expansion by using the above negative active material. For example, the active mass density of the negative electrode may be greater than or equal to about 1.70 g/cc, for example, in a range of about 1.70 g/cc to about 2.1 g/cc or about 1.70 g/cc to about 1.80 g/cc.

The negative electrode may be manufactured by a method including mixing the negative active material and optionally the binder and the conductive material in a solvent to prepare slurry, and coating the slurry on a current collector. The solvent may be water, N-methylpyrrolidone, and/or the like but is not limited thereto.

Hereinafter, a rechargeable lithium battery according to one embodiment is described referring to FIG. 1.

Figure 1:
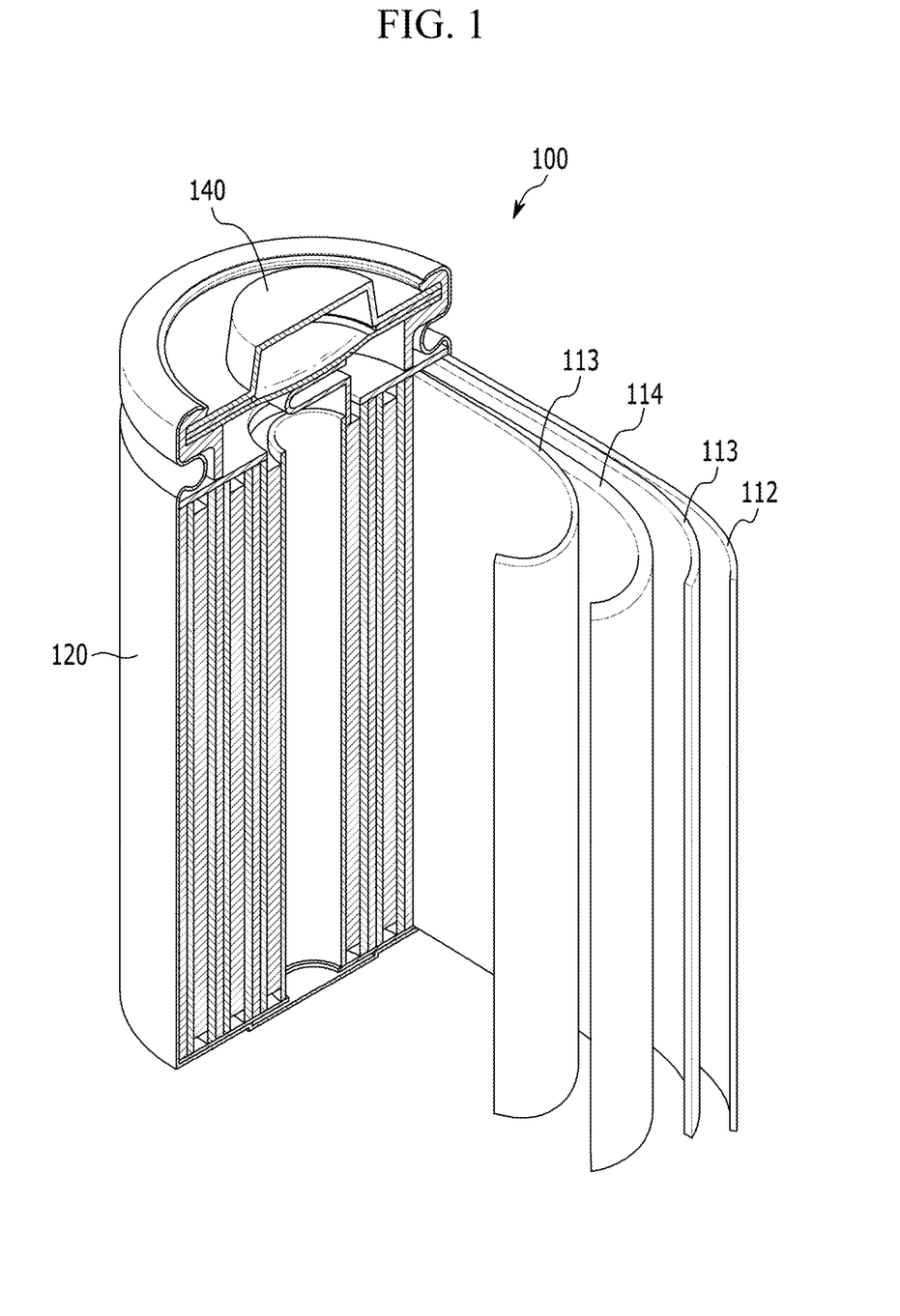
FIG. 1 is a schematic view showing a rechargeable lithium battery according to an embodiment.

FIG. 1 is a schematic view showing the lithium rechargeable battery according to one embodiment.

Referring to FIG. 1, a rechargeable lithium battery 100 according to one embodiment includes an electrode assembly including a positive electrode 114, a negative electrode 112 facing the positive electrode 114, a separator 113 interposed between the positive electrode 114 and the negative electrode 112, and an electrolyte solution impregnating the positive electrode 114, the negative electrode 112, and the separator 113, a battery case 120 housing the electrode assembly, and a sealing member 140 sealing the battery case 120.

The rechargeable lithium battery according to one embodiment is not limited to a cylindrical shape of FIG. 1, and may be any prismatic, coin-type, or pouch shape as long as a battery including the negative active material for a rechargeable lithium battery according to one embodiment is operated.

The negative electrode 112 is the same as those described above.

The positive electrode 114 includes a current collector and a positive active material layer formed on the current collector. The positive active material layer includes a positive active material, and optionally a binder and a conductive material.

The current collector may be Al (aluminum), but is not limited thereto.

The positive active material may include lithiated intercalation compounds that reversibly intercalate and deintercalate lithium ions. For example, at least one composite oxide of lithium and a metal such as cobalt, manganese, nickel, or a combination thereof may be used, and examples thereof may be a compound represented by one of the following Chemical Formulae:

$Li_aA_{1-b}B_bD_2$ (0.90≤a≤1.8 and 0≤b≤0.5); $Li_aE_{1-b}B_bO_{2-c}D_c$ (0.90≤a≤1.8, 0≤b≤0.5, 0≤c≤0.05); $Li_aE_{2-b}B_bO_{4-c}D_c$ (0.90≤a≤1.8, 0≤b≤0.5, 0≤c≤0.05); $Li_aNi_{1-b-c}Co_bB_cD_\alpha$ (0.90≤a≤1.8, 0≤b≤0.5, 0≤c≤0.05, 0<α≤2); $Li_aNi_{1-b-c}Co_bB_cO_{2-\alpha}F_\alpha$ (0.90≤a≤1.8, 0≤b≤0.5, 0≤c≤0.05, 0<α<2); $Li_aNi_{1-b-c}Co_bB_cO_{2-\alpha}F_2$ (0.90≤a≤1.8, 0≤b≤0.5, 0≤c≤0.05, 0<α<2); $Li_aNi_{1-b-c}Mn_bB_cD_\alpha$ (0.90≤a≤1.8, 0≤b≤0.5, 0≤c≤0.05, 0<α≤2); $Li_aNi_{1-b-c}Mn_bB_cO_{2-\alpha}F_\alpha$ (0.90≤a≤1.8, 0≤b≤0.5, 0≤c≤0.05, 0<α<2); $Li_aNi_{1-b-c}Mn_bB_cO_{2-\alpha}F_2$ (0.90≤a≤1.8, 0≤b≤0.5, 0≤c≤0.05, 0<α<2); $Li_aNi_bE_cG_dO_2$ (0.90≤a≤1.8, 0≤b≤0.9, 0≤c≤0.5, 0.001≤d≤0.1); $Li_aNi_bCo_cMn_dG_eO_2$ (0.90≤a≤1.8, 0≤b≤0.9, 0≤c≤0.5, 0≤d≤0.5, 0.001≤e≤0.1); $Li_aNiG_bO_2$ (0.90≤a≤1.8, 0.001≤b≤0.1); $Li_aCoG_bO_2$ (0.90≤a≤1.8, 0.001≤b≤0.1); $Li_aMnG_bO_2$ (0.90≤a≤1.8, 0.001≤b≤0.1); $Li_aMn_2G_bO_4$ (0.90≤a≤1.8, 0.001≤b≤0.1); $QO_2$; $QS_2$; $LiQS_2$; $V_2O_5$; $LiV_2O_5$; $LiIO_2$; $LiNiVO_4$; $Li_{(3-f)}J_2(PO_4)_3$ (0≤f≤2); $Li_{(3-f)}Fe_2(PO_4)_3$ (0≤f≤2); and $LiFePO_4$.

In the above chemical formulae, A is Ni, Co, Mn, or a combination thereof; B is Al, Ni, Co, Mn, Cr, Fe, Mg, Sr, V, a rare earth element, or a combination thereof; D is O, F, S, P, or a combination thereof; E is Co, Mn, or a combination thereof; F is F, S, P, or a combination thereof; G is Al, Cr, Mn, Fe, Mg, La, Ce, Sr, V, or a combination thereof; Q is Ti, Mo, Mn, or a combination thereof; I is Cr, V, Fe, Sc, Y, or a combination thereof; and J is V, Cr, Mn, Co, Ni, Cu, or a combination thereof.

The binder improves binding properties of positive active material particles with one another and with a current collector. Examples thereof may be polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and/or the like, but are not limited thereto.

The conductive material provides an electrode with conductivity. Any electrically conductive material may be used as a conductive material unless it causes a chemical change. Examples of the conductive material include one or more natural graphite, artificial graphite, carbon black, acetylene black, ketjen black, a carbon fiber, carbon nanotube, carbon nanofiber, a metal powder or a metal fiber of copper, nickel, aluminum, silver, a polyphenylene derivative and/or the like.

The positive electrode may be manufactured by a method including mixing the positive active material and optionally the conductive material and the binder in a solvent to prepare a slurry, and coating the slurry on a current collector. The solvent may be N-methylpyrrolidone, but is not limited thereto. The positive electrode manufacturing method may be any suitable method available in the art, and thus further description thereof is not necessary.

The electrolyte solution includes an organic solvent and a lithium salt.

The organic solvent serves as a medium for transmitting ions taking part in the electrochemical reaction of a battery. The organic solvent may include a carbonate-based solvent, an ester-based solvent, an ether-based solvent, a ketone-based solvent, an alcohol-based solvent, and/or an aprotic solvent.

The carbonate based solvent may be, for example dimethyl carbonate (DMC), diethyl carbonate (DEC), dipropyl carbonate (DPC), methylpropyl carbonate (MPC), ethylpropyl carbonate (EPC), ethylmethyl carbonate (EMC), ethylene carbonate (EC), propylene carbonate (PC), butylene carbonate (BC) and/or the like.

For example, when a linear carbonate compound and a cyclic carbonate compound are mixed, an organic solvent having a high dielectric constant and a low viscosity may be provided. The cyclic carbonate compound and the linear carbonate compound are mixed together in a volume ratio ranging from about 1:1 to about 1:9.

In addition, the ester-based solvent may be, for example, methylacetate, ethylacetate, n-propylacetate, methylpropionate, ethylpropionate, γ-butyrolactone, decanolide, valerolactone, mevalonolactone, caprolactone, and/or the like. The ether solvent may be, for example dibutylether, tetraglyme, diglyme, dimethoxyethane, 2-methyltetrahydrofuran, tetrahydrofuran, and/or the like, and the ketone-based solvent may be cyclohexanone, and/or the like. In addition, the alcohol-based solvent may be ethanol, isopropyl alcohol, and/or the like.

The organic solvent may be used singularly or in a mixture, and when the organic solvent is used in a mixture, the mixture ratio may be controlled in accordance with a desirable or suitable cell performance.

The electrolyte solution may further include an overcharge inhibitor additive such as ethylene carbonate, pyrocarbonate, and/or the like.

The lithium salt is dissolved in an organic solvent, supplies lithium ions in a battery, operates the rechargeable lithium battery, and improves lithium ion transportation between positive and negative electrodes therein.

Examples of the lithium salt may be $LiPF_6$, $LiBF_4$, $LiSbF_6$, $LiAsF_6$, $LiN(SO_3C_2F_5)_2$, $LiC_4F_9SO_3$, $LiClO_4$, $LiAlO_2$, $LiAlCl_4$, $LiN(C_xF_{2x+1}SO_2)(C_yF_{2y+1}SO_2)$, wherein, x and y are natural numbers, e.g., an integer of 1 to 20, LiCl, LiI, $LiB(C_2O_4)_2$ (lithium bis(oxalato) borate; LiBOB), or a combination (e.g., mixture) thereof.

The lithium salt may be used in a concentration ranging from about 0.1 M to about 2.0 M. When the lithium salt is included at the above concentration range, an electrolyte solution may have excellent performance and lithium ion mobility due to optimal electrolyte conductivity and viscosity.

The separator 113 may include any suitable materials available for use in the conventional lithium battery as long as they separate the negative electrode from the positive electrode and provide a transporting passage for lithium ions. In other words, the separator may have a low resistance to ion transportation and an excellent impregnation for an electrolyte solution. For example, it may be glass fiber, polyester, TEFLON (tetrafluoroethylene), polyethylene, polypropylene, polytetrafluoroethylene (PTFE), or a combination thereof. It may have a form of a non-woven fabric or a woven fabric. For example, a polyolefin-based polymer separator such as polyethylene, polypropylene and/or the like is mainly used for a lithium ion battery. In order to ensure the heat resistance or mechanical strength, a coated separator including a ceramic component or a polymer material may be used. Selectively, it may have a monolayered or multi-layered structure.

Hereinafter, the embodiments are illustrated in more detail with reference to examples. However, these examples are exemplary, and the present disclosure is not limited thereto. Furthermore, what is not described in this disclosure may be sufficiently understood by those who have knowledge in this field and will not be illustrated here.

(Manufacture of Negative Electrode)

Example 1

A negative active material obtained by mixing 95 wt % of graphite having a particle diameter (D50) of 23 μm and 5 wt % of flake-shaped graphite having a length of 3 μm, carboxylmethyl cellulose (CMC), and a styrene-butadiene rubber (SBR) in a weight ratio of 97.5:1:1.5 are mixed in water, thus preparing a slurry. The slurry was coated on a Cu thin film as a current collector, dried, and compressed, thus manufacturing a negative electrode having a loading level of 20 mg/cm$^2$ and active mass density as shown in the following Table 1.

Example 2

A negative electrode was manufactured according to the same method as Example 1 except for using a negative active material obtained by mixing 95 wt % of graphite having a particle diameter (D50) of 14 μm and 5 wt % of flake-shaped graphite having the longest length of 3 μm. The active mass density of the negative electrode as shown in the following Table 1.

Comparative Example 1

A negative electrode was manufactured according to the same method as Example 1 except for using graphite having a particle diameter (D50) of 23 μm as a negative active material. The active mass density of the negative electrode as shown in the following Table 1.

Reference Example 1

A negative electrode was manufactured according to the same method as Example 1 except for using a negative active material obtained by mixing 90 wt % of graphite having a particle diameter (D50) of 23 μm and 10 wt % of flake-shaped graphite having the longest length of 3 μm. The active mass density of the negative electrode as shown in the following Table 1.

Comparative Example 2

A negative electrode was manufactured according to the same method as Example 1 except for using a negative active material obtained by mixing 95 wt % of graphite having a particle diameter (D50) of 30 μm and 5 wt % of flake-shaped graphite having the longest length of 0.5 μm. The active mass density of the negative electrode as shown in the following Table 1.

Comparative Example 3

A negative electrode was manufactured according to the same method as Example 1 except for using a negative active material obtained by mixing 95 wt % of graphite having a particle diameter (D50) of 14 μm and 5 wt % of flake-shaped graphite having the longest length of 12 μm. The active mass density of the negative electrode as shown in the following Table 1.

(Manufacture of Rechargeable Lithium Battery Cell)

A positive electrode was manufactured by mixing 97.5 wt % of $LiCoO_2$, 1.5 wt % of polyvinylidene fluoride (PVdF), and 1 wt % of a carbon nanotube dispersion in N-methylpyrrolidone to prepare a slurry, coating the slurry on an Al foil, and then, drying and compressing it.

Each negative electrode according to Examples 1 and 2, Comparative Examples 1 to 3, and Reference Example 1, the positive electrode, a polyethylene separator, and an electrolyte solution were used to manufacture a rechargeable lithium battery. Herein, the electrolyte solution was prepared by mixing ethylene carbonate (EC), ethylmethyl carbonate (EMC), and dimethyl carbonate (DMC) in a volume ratio of 3:5:2 to obtain an organic solvent and dissolving 1.5 M $LiPF_6$ therein.

Evaluation 1: SEM Analysis of Negative Electrode

Figure 2:
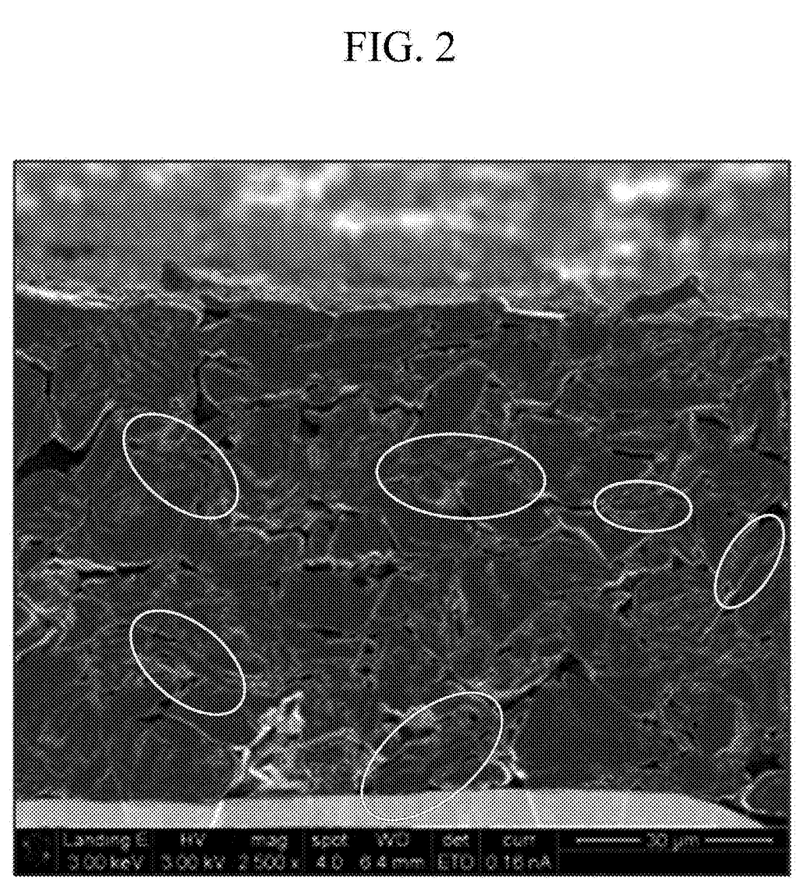
FIG. 2 is a scanning electron microscope (SEM) image showing a cross section of a negative electrode for a rechargeable lithium battery according to Example 1.
Figure 3:
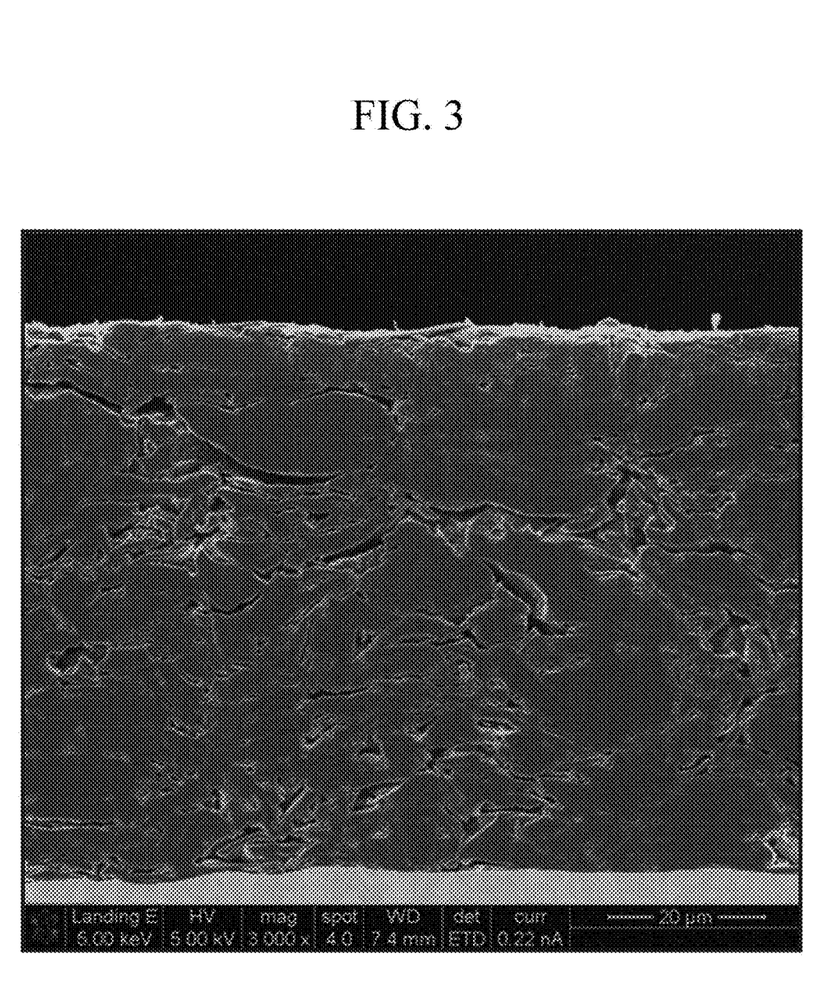
FIG. 3 is a scanning electron microscope (SEM) image showing a cross section of a negative electrode for a rechargeable lithium battery according to Comparative Example 1.

FIG. 2 is a scanning electron microscope (SEM) image showing the cross-section of the negative electrode for a rechargeable lithium battery according to Example 1. FIG. 3 is a scanning electron microscope (SEM) image showing the cross-section of the negative electrode for a rechargeable lithium battery according to Comparative Example 1.

Referring to FIG. 2, the negative electrode of Example 1 shows that flake-shaped graphite particles as a second active material (showed as a circle in FIG. 2) were present among graphite particles as a first active material and that pores were minimized and uniformly distributed in an electrode because the flake-shaped graphite particles gave fluidity to the negative active material. On the contrary, referring to FIG. 3, the negative electrode of Comparative Example 1 shows that pores were formed in some regions of an electrode including no flake-shaped graphite particles and had a larger pore size and higher porosity than the one of Example 1.

Evaluation 2: Porosity Analysis of Negative Electrode

Porosity analysis results of the negative electrodes according to Examples 1 and 2, Comparative Examples 1 to 3, and Reference Example 1 were provided in the following Table 1.

The porosity was evaluated as follows. The negative electrodes were treated to evaporate moisture at 145° C. for 6 hours in a vacuum-drying (V/D) chamber. The finished electrode was wound into a jelly-roll, and the jelly-roll was decomposed and analyzed to examine to what degree it sprang back (degree of expansion) before assembly, and actual mass of the electrode during the assembly was measured to obtain the porosity. The porosity was calculated according to the following equation 1.

Porosity (volume %)=[1−(Actual mass of electrode during assembly/True density of graphite)]×100    Equation 1

In the Equation 1, true density of graphite is 2.24 g/cc.

TABLE 1

| | Active mass density (g/cc) | Porosity (volume %) |
|---|---|---|
| Example 1 | 1.72 | 23.2 |
| Example 2 | 1.70 | 24.1 |
| Comparative Example 1 | 1.60 | 28.6 |
| Reference Example 1 | 1.70 | 24.1 |
| Comparative Example 2 | 1.65 | 26.3 |
| Comparative Example 3 | 1.62 | 27.7 |

Referring to Table 1, the negative electrodes according to Examples 1 and 2 had porosity in a range of 5 volume % to 25 volume %. On other hand, the negative electrode of Reference Example 1 had porosity within the range but showed deteriorated impregnation and orientation of the electrolyte solution as illustrated in the following evaluation.

Evaluation 3: Impregnation of Electrolyte Solution of Negative Electrode

Figure 4:
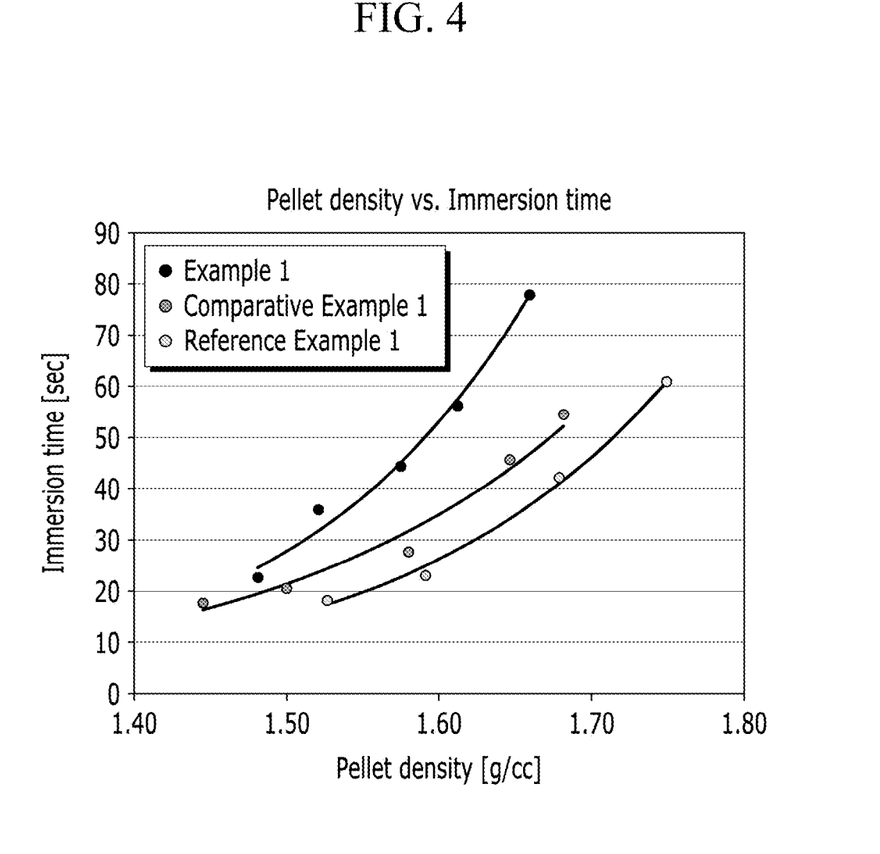
FIG. 4 is a graph showing impregnation of an electrolyte solution into negative electrodes for a rechargeable lithium battery according to Example 1, Comparative Example 1, and Reference Example 1.

Impregnation of an electrolyte solution regarding the negative electrodes according to Example 1, Comparative Example 1, and Reference Example 1 were evaluated, and the results are shown in FIG. 4.

The impregnation of the electrolyte solution was evaluated according to the following method.

Each slurry according to Example 1, Comparative Example 1, and Reference Example 1, that is, each slurry obtained by mixing a negative active material, CMC, and SBR was poured into an aluminum foil container and completely dried in a 110° C. oven. The dried slurry powder was ground with a mortar and a pestle and sieved with a 250 mesh sieve. 1 g of the slurry was weighed and put in a pellet jig, thus manufacturing a pellet having active mass density of 1.50 g/cc to 1.80 g/cc. The completed slurry pellet was allowed to stand for 6 hours, and then, weight and thickness of the pellet were measured. Herein, the measured thickness and weight were used to calculate active mass density. 50 μl of the electrolyte solution was carefully dropped on the pellet and covered with a cap for preventing evaporation of the electrolyte solution. The amount of time it took until the electrolyte solution was completely impregnated was measured.

FIG. 4 is a graph showing impregnation of an electrolyte solution into each negative electrode for a rechargeable lithium battery according to Example 1, Comparative Example 1, and Reference Example 1.

Referring to FIG. 4, the negative electrode including flake-shaped graphite particles according to Example 1 absorbed the electrolyte solution at a faster impregnation speed than the negative electrodes according to Comparative Example 1 and Reference Example 1. Accordingly, when flake-shaped graphite particles were added to a negative active material, fluidity was given to the negative active material, and an electrode plate having a structure where pores were uniformly distributed was manufactured.

Evaluation 4: Orientation Degree of Negative Electrode

Figure 5:
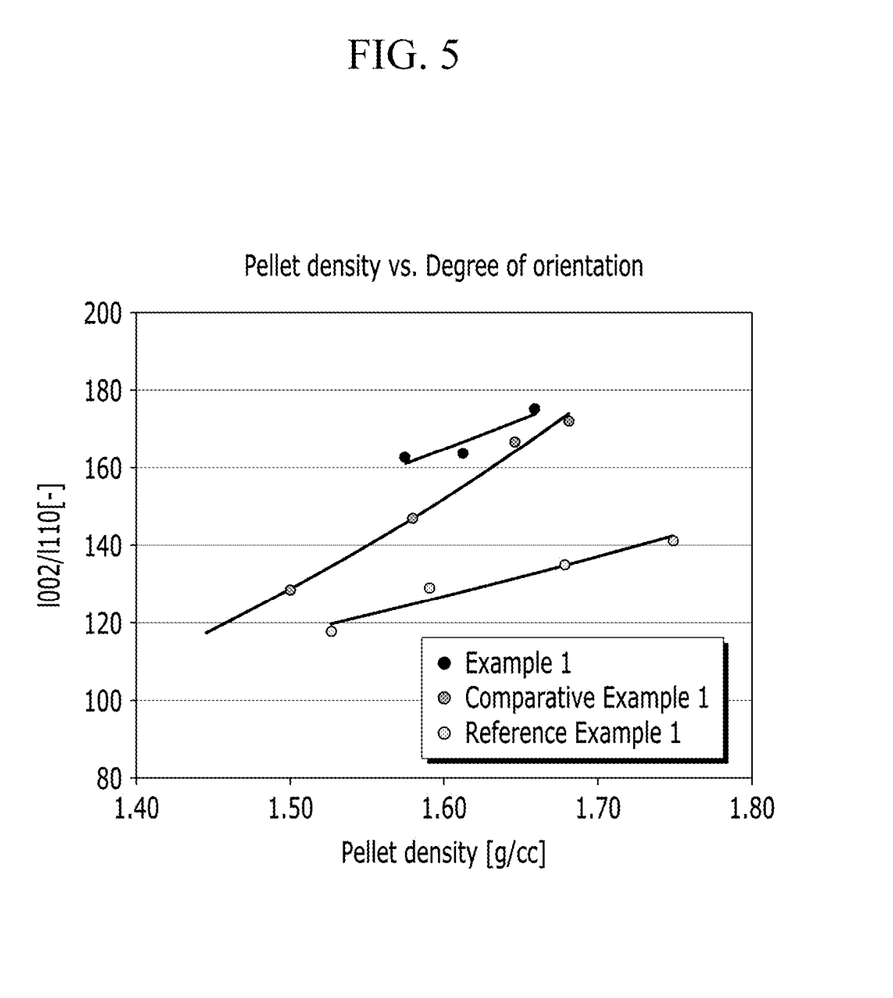
FIG. 5 is a graph showing orientation of the negative electrodes for a rechargeable lithium battery according to Example 1, Comparative Example 1, and Reference Example 1.

An orientation degree of the negative electrodes according to Example 1, Comparative Example 1, and Reference Example 1 was evaluated through an X-ray diffraction (XRD) analysis using a CuKα ray, and the results are provided in FIG. 5.

The orientation degree of the negative electrodes was evaluated as follows. Each slurry according to Example 1, Comparative Example 1, and Reference Example 1, that is, each slurry obtained by mixing a negative active material, CMC, and SBR was poured into an aluminum foil container and completely dried in a 110° C. oven. The dried slurry powder was ground with a mortar and a pestle and sieved with a 250 mesh sieve. 1 g of the powder was weighed and put in a pellet jig, thus manufacturing a pellet having active mass density of 1.50 g/cc to 1.80 g/cc. The completed slurry pellet was allowed to stand for 6 hours, and weight and thickness of the pellet were measured. Herein, the thickness and the weight were used to calculate active mass density. The slurry pellet was charged in a holder for an XRD equipment, pressed with a slide glass to make its surface even, and then, XRD-analyzed within a 2θ range of 20° to 80°. In the final analysis data, the height ($I_{002}$) of a peak appeared at about 26° of 2θ and the height ($I_{110}$) of a peak appeared at about 76° of 2θ were measured. The ratio of the height ($I_{002}$) of the peak to the height ($I_{110}$) of the peak is shown in FIG. 5

FIG. 5 is a graph showing the orientation degrees of the negative electrodes according to Example 1, Comparative Example 1, and Reference Example 1. In FIG. 5, [-] indicates no unit.

Referring to FIG. 5, the negative electrode including flake-shaped graphite particles according to Example 1 showed an excellent orientation degree compared with the negative electrodes according to Comparative Example 1 and Reference Example 1. Accordingly, when flake-shaped graphite particles were added to a negative active material, the negative electrode material had fluidity, and an electrode plate had a structure where pores were uniformly distributed and received less stress when pressed and thus higher random-orientation. In FIG. 5, $I_{002}/I_{110}$ is an index showing a random-orientation degree. The smaller the $I_{002}/I_{110}$ was, the higher the multi-orientation was, and as the random-orientation was higher, strength might be more evenly distributed in a negative active material, which may have an advantageous effect on expansion of a cell.

Evaluation 5: Cell Expansion Ratio

Figure 6:
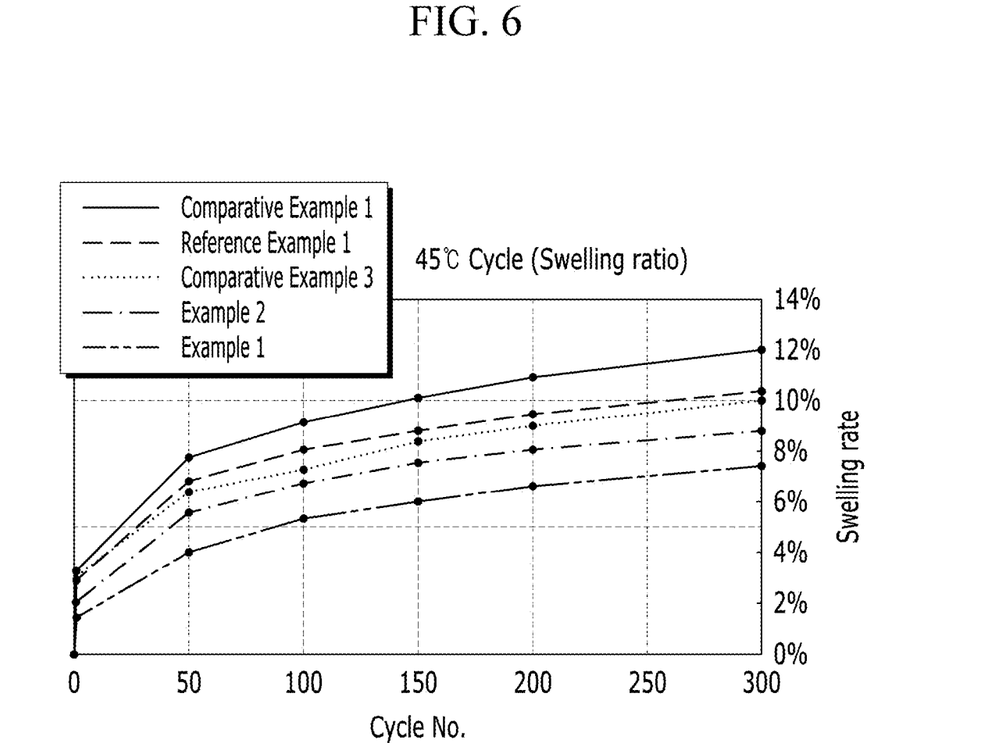
FIG. 6 is a graph showing cell expansion ratios of rechargeable lithium battery cells according to Examples 1 and 2, Comparative Example 1 and 3, and Reference Example 1.

The rechargeable lithium battery cells according to Examples 1 and 2, Comparative Examples 1, and 3, and Reference Example 1 were respectively measured regarding a cell expansion ratio at a high temperature according to the following method, and the results are shown in FIG. 6.

The cell expansion ratio was obtained by directly measuring thickness of the cells at 45° C. for every 50 charge and discharge cycles with a vernier or a PPG gauge and then calculating what percentage (%) the cell expanded compared with the thickness at the 1st cycle. The charging was performed at 0.7 C and the discharging was performed at 0.5 C.

FIG. 6 is a graph showing the cell expansion ratios of the rechargeable lithium battery cells according to Examples 1 and 2, Comparative Examples 1 and 3, and Reference Example 1.

Referring to FIG. 6, Examples 1 and 2 including flake-shaped graphite particles showed a lower cell expansion ratio than Comparative Example 1 and Reference Example 1.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

What is claimed is:

1. A negative electrode for a rechargeable lithium battery, comprising:
   a negative active material layer comprising a negative active material,
   wherein:
   the negative active material comprises a first active material and a second active material different from the first active material,
   the second active material comprises flake-shaped graphite,
   a ratio of a particle diameter (D50) of the first active material relative to the longest length of the second active material is about 2 to about 50, and
   the negative electrode has an active mass density of greater than or equal to about 1.70 g/cc.

2. The negative electrode of the claim 1, wherein the second active material comprises a shorter side and a longer side, the longer side having a length of about 0.5 µm to about 10 µm.

3. The negative electrode of claim 1, wherein the second active material is located between a plurality of first active materials.

4. The negative electrode of claim 1, wherein the first active material comprises a carbon-based material, a silicon-based material, or a combination thereof.

5. The negative electrode of claim 1, wherein the first active material has a particle diameter (D50) of about 5 µm to about 40 µm.

6. The negative electrode of claim 1, wherein the negative active material layer has porosity of about 5 volume % to about 25 volume %.

7. The negative electrode of claim 1, wherein the negative electrode has a loading level of about 10 mg/cm$^2$ to about 40 mg/cm$^2$.

8. The negative electrode of claim 1, wherein the negative active material comprises about 1 wt % to about 8 wt % of the second active material based on a total amount of the first active material and the second active material.

9. A rechargeable lithium battery comprising the negative electrode of claim 1.

* * * * *